United States Patent
Kress

(10) Patent No.: US 6,776,553 B2
(45) Date of Patent: Aug. 17, 2004

(54) CONNECTION POINT

(75) Inventor: Dieter Kress, Aalen (DE)

(73) Assignee: MaPal Fabrik für Präzisionwerkzeuge Dr. Kress KG, Aalen (DE)

( * ) Notice: Subject to any disclaimer, the term of this patent is extended or adjusted under 35 U.S.C. 154(b) by 107 days.

(21) Appl. No.: 10/100,447

(22) Filed: Mar. 18, 2002

(65) Prior Publication Data

US 2002/0152853 A1 Oct. 24, 2002

(30) Foreign Application Priority Data

Mar. 22, 2001 (DE) .......................................... 101 14 746

(51) Int. Cl.[7] ................................................ F16D 1/00
(52) U.S. Cl. .................... 403/203; 403/202; 403/13; 403/355; 403/357; 279/67; 408/239 R; 409/233; 409/234
(58) Field of Search ....................... 279/67; 408/239 R; 409/233, 234; 403/13, 14, 202, 203, 206, 209, 211–213, 220, 278–280, 282, 355–357, 365–368

(56) References Cited

U.S. PATENT DOCUMENTS 4,283,158 A    8/1981   Takahata
4,585,380 A *  4/1986   Naito ........................ 409/234
5,674,026 A * 10/1997   Ishibashi et al. ............ 403/357
5,807,180 A *  9/1998   Knodle et al. ............. 403/357
5,810,506 A    9/1998   Kress et al.
6,419,430 B2 * 7/2002   Hangleiter ................. 409/233

FOREIGN PATENT DOCUMENTS

DE          28 56720 A1    12/1978
DE          0 753 680 A1    1/1997
JP          2001150269      6/2001

OTHER PUBLICATIONS

Japan Abstract No. 2001150269, dated Jun. 5, 2001; Inventor: Komine Takeshi; Title: Tool Positioning Member of Tool Holder and Tool Holder.

* cited by examiner

Primary Examiner—Anthony Knight
Assistant Examiner—Michael P. Ferguson
(74) Attorney, Agent, or Firm—Morriss O'Bryant Compagni, P.C.

(57) ABSTRACT

Proposed is a connecting point between two tool parts with a device, comprising an elastic element, for effecting a defined angular position of rotation between the tool parts. Said connecting point is characterized in that the elastic element (23) in a first area (43) is clamped to the first tool part (3) in such a manner that in connecting the tool parts (3, 7) a second area (25) projects into the path of motion of the second tool part (7) so that it is deflected by said tool part and is deformed reversibly.

20 Claims, 5 Drawing Sheets

CONNECTION POINT

DESCRIPTION

The invention relates to a connecting point between two tool parts.

Connecting points of the type discussed here exist. They appear in the area of two tool parts that are connected together. It is conceivable that, for example, a tool is fastened to a holder, which is part of a machine tool or is attached to it. It is also possible that a connecting point of the type discussed here is between a tool and an intermediate part, a tool and an adapter or between intermediate parts and adapters. It is important that in the area of the connecting point between two tool parts there is a defined angular position so that in changing a tool when machining a workpiece the dimension does not vary. For example, a tool for a chip removing operation, such as a lathe tool or a reamer, can be changed when the cutter plate is worn without the dimensions of the machined boreholes changing during the subsequent machining operation of the workpiece.

To set the desired angular position, devices are installed in the area of the connecting points. These devices enable a defined positioning of the two tool parts joined together at the connecting point. However, in some cases elastic elements that have been used to date do not have adequate adjusting forces so that the positioning of the two tool parts was not always optimal in the area of the connecting point.

SUMMARY OF THE INVENTION

Therefore, the object of the invention is to provide a connecting point of the class that is described in the introductory part and that avoids this drawback.

To solve this problem, a connecting point is proposed that exhibits the features disclosed in the claims. It is characterized by a device for effecting a defined angular position of rotation between the tool parts to be connected. Said device also comprises an elastic element. Said elastic element is clamped to a first tool part in a first area in such a manner that a second area of the elastic element projects into the second tool part's path of motion when the tool parts are being connected. Thus, the goal is reached that in joining together the two tool parts this second area is deflected by the second tool part and is deformed reversibly. This deformation leads to a prestress force of the elastic element that is clamped stationarily in the first area and that effects a relative rotation of the two tool parts, thus resulting in a defined angular position of rotation.

Preferred is an embodiment of the invention that is characterized in that the elastic element is designed as a torsion element. Thus, it is possible to vary over a wide range the forces, required to bring about the angular position of rotation.

Other advantages are disclosed in the other dependent claims.

BRIEF DESCRIPTION OF THE DRAWINGS

The invention is explained in detail below with reference to the drawings.

DETAILED DESCRIPTION

Figure 1:
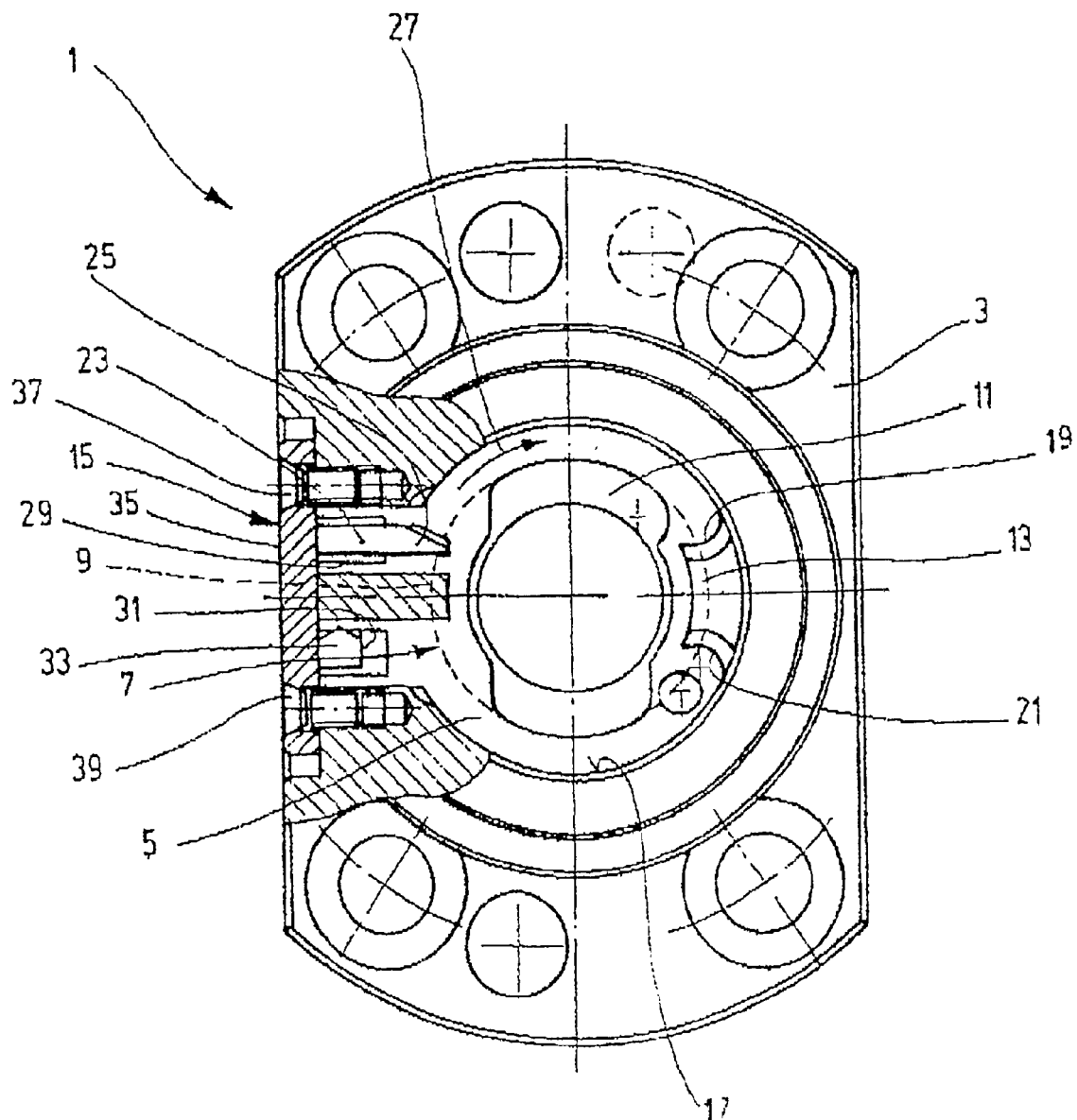
FIG. 1 is a top view of a first tool part of a connecting point.

The connecting point 1, explained in the following, comprises two tool parts, of which a first one is reproduced in a top view in FIG. 1. The first tool part 3 exhibits a recess 5, into which can be inserted a second tool part 7, which is indicated here by means of a dashed circle 9. In the middle of the recess 5 there is a collet 11 that serves to fasten the second tool part 7 to the first tool part 3. The second tool part 7 exhibits a hollow shaft, which is inserted into the recess 5, so that the collet 11 is disposed inside the hollow shaft and clamps it securely in producing the connecting point 1, thus when the two tool parts 3 and 7 are being clamped in the recess 5, in that said recess is expanded radially.

The hollow shaft of the second tool part 7 exhibits two slots, which run in the longitudinal direction of the tool part 7 and with which, on the one hand, a projection 13 and, on the other hand, a device 15 for effecting a defined angular position of rotation engage. The projection 13 originates from the inner surface 17 of the recess 5 in the first tool part 3. It is dimensioned in such a manner that it almost totally fills the slot, present in the hollow shaft of the second tool part 7. Thus, the side faces 19 and 21 of the projection 13 can serve as abutment surfaces for the flanks of the slot in the hollow shaft of the second tool part 7.

Opposite the first slot, receiving the projection 13, in the second tool part 7 is a second slot, with which an elastic element 23 of the device 15 engages. The elastic element 23 is clamped stationarily to the first tool part 3 in a first area and projects with a second area 25 into the recess 5 in such a manner that it lies in the path of motion of the second tool part 7, when it is inserted into the recess 5. In joining together the connecting point 1, thus in inserting the second tool part 7 into the recess 5 of the first tool part 3, the second area 25 of the elastic element 23 is deflected reversibly, a feature that effects a reset force. Thus, a force, acting clockwise here, is built up that acts on the hollow shaft of the second tool part 7, a state that is indicated by an arrow 27. Owing to the force, exerted by the elastic element 23, the hollow shaft of the second tool part 7 rotates clockwise until it strikes against the upper side face 19 of the projection 13, thus resulting in a defined angular position of rotation between the two tool parts of the connecting point 1. After said connecting point is defined by the device 15, the collet 11 is activated in order to clamp stationarily the second tool part 7 in the first tool part 3.

The elastic element 23 is housed in a first groove 29, inserted from the outside into the wall of the first tool part 3. Parallel to said groove runs a second groove 31, into which a counter-piece 33 is inserted.

The elastic element 23 and the counter-piece 33 are clamped rigidly by means of a cover plate 35, which is fastened to the first tool part 3 by screws 37 and 39.

Figure 2:
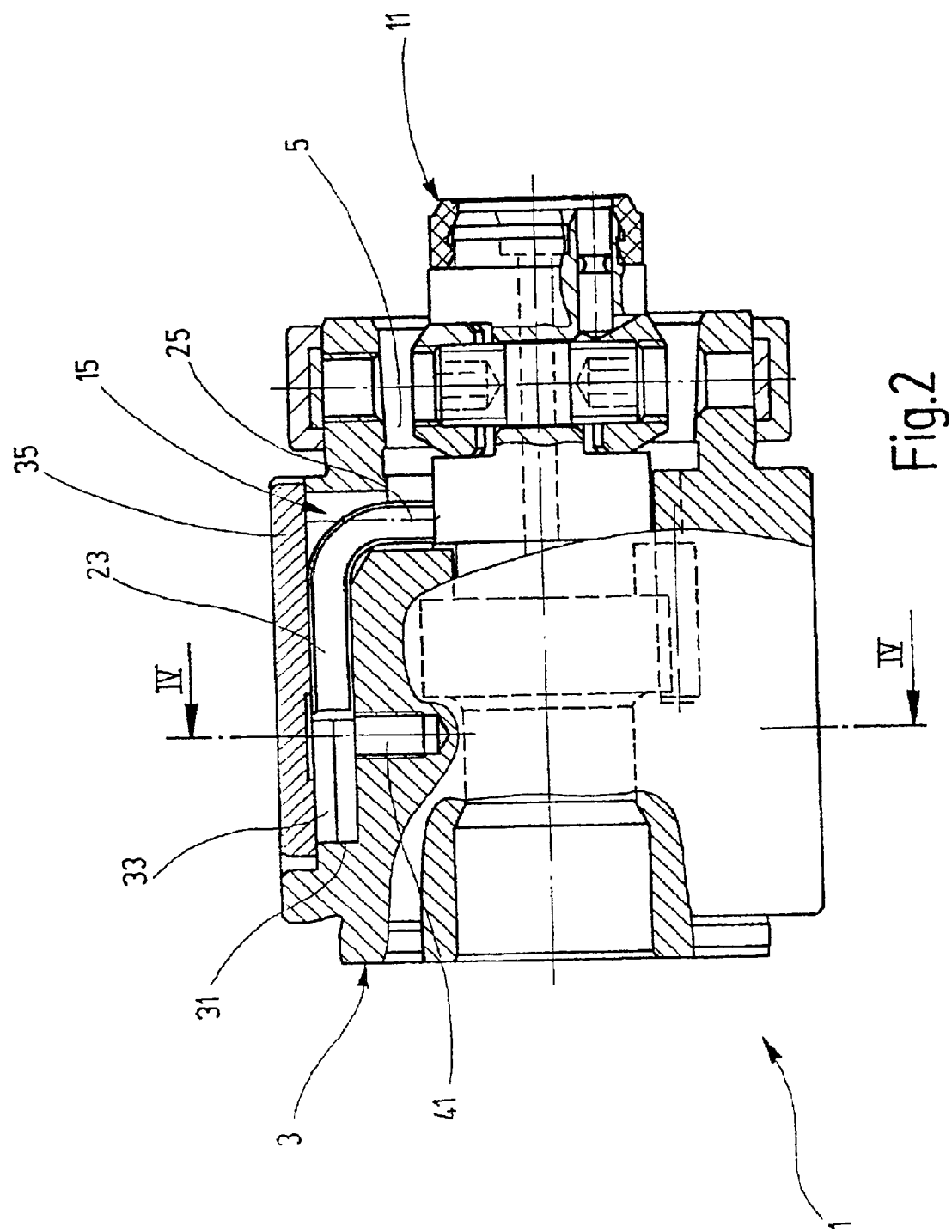
FIG. 2 is a longitudinal sectional view of the tool part depicted in FIG. 1.

FIG. 2 is a longitudinal view of the first tool part 3. Identical parts, which were explained with reference to FIG. 1, are provided with the same reference numerals so that reference is made in this respect to the description of FIG. 1.

The longitudinal sectional view is placed in such a manner that the counter-piece 33 can be recognized in the side view. It lies in the second groove 31. The elastic element 23, whose first area, covered by the counter-piece 33, is disposed in the first groove 29, can be recognized behind the counter-piece 33. The first covered area of the elastic element 23 is provided, like the counter-piece 33, with an outer contour, whose peripheral area deviates in its cross section from the circular contour. It is designed here as a polygon. This polygonal contour is supposed to ensure that the elastic element 23 in the first area is held in the wall of the first tool part 3 so as not to rotate. The here pentagonal contour of the counter-piece 33, which agrees with that of the first area of the elastic element 23, is evident from the drawing, according to FIG. 1. It is chosen in such a manner that the first area of the elastic element 23 and the counter-piece 33 are held twist-proof in the base body of the first tool part 3. FIG. 2 shows a clamping bolt 41, which runs vertically to the reach of the counter-piece 33 and the first area 43 of the elastic element 23 and engages with the base body of the first tool part 3 and also serves to clamp the first area of the elastic element 23 and the counter-piece 33 so as not to rotate in the first tool part 3.

The drawing, according to FIG. 2, shows that the second area 25 of the elastic element 23 projects into the recess 5 of the first tool part 3 in such a manner that it also protrudes into the path of motion of the second tool part 7 when its hollow shaft is inserted into the recess 5.

FIG. 2 illustrates that the elastic element 23 is designed as a torsion element and exhibits in essence an L shape. At the end of the longer leg of the elastic element 23 there is the first area, which is clamped twist-proof to the first tool part 3 behind the counter-piece 33. The shorter leg of the elastic element 23, thus the second area 25, projects into the recess 5 so as to move freely for the purpose of interacting, as necessary, with the hollow shaft of the second tool part 7.

Figure 3:
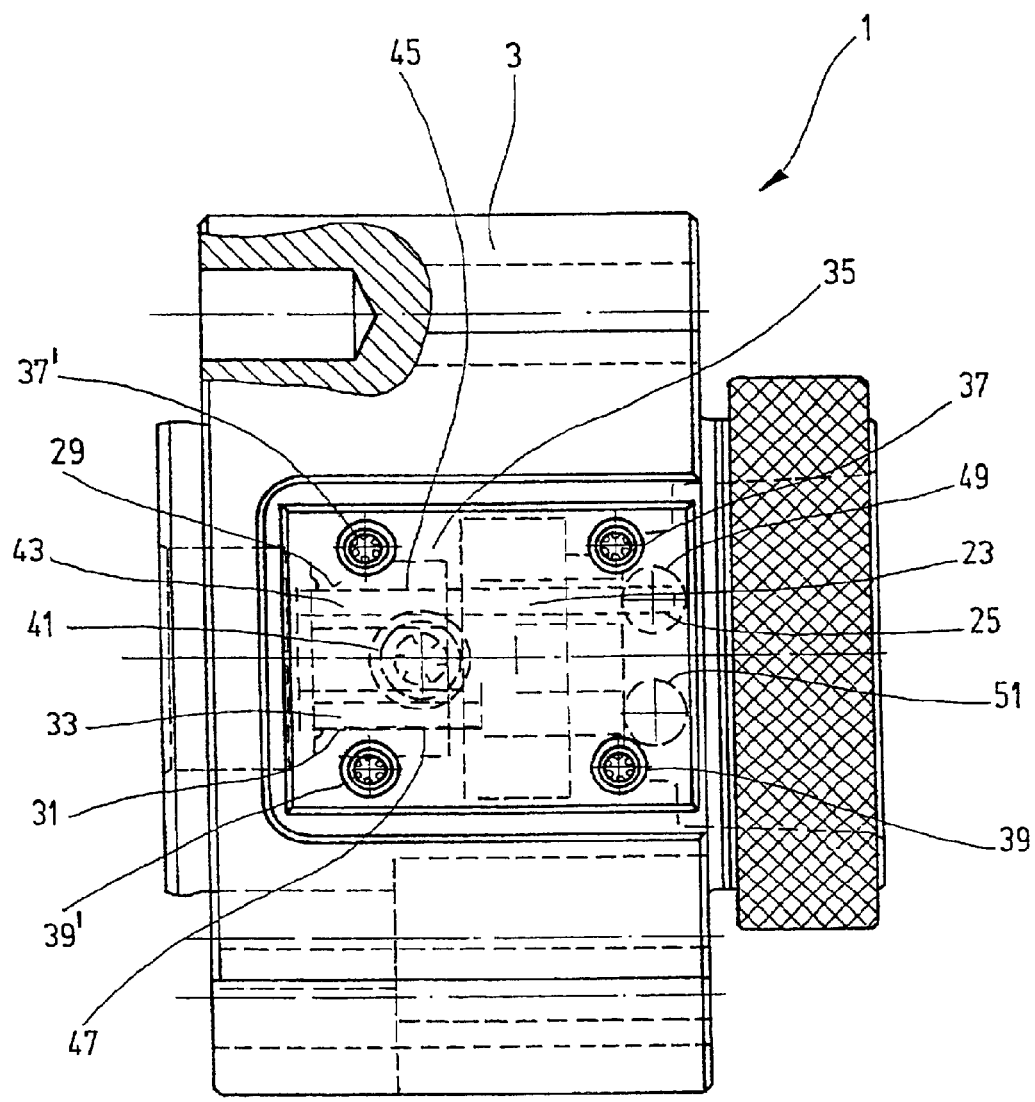
FIG. 3 is a side view of the tool part depicted in FIG. 1.

FIG. 3 is a side view of the first tool part 3 of the connecting point 1. The cover plate 35 can be clearly perceived here. It is held not only by the screws 37 and 39, depicted in FIG. 1, but also by two other screws 37' and 39'. A dashed line indicates in FIG. 3 the elastic element 23, which is housed in the related first groove 29, in addition the counter-piece 33, which is disposed in the second groove 31. Here it is also plain to see that the counter-piece is shorter than the elastic element 23 and extends only over one area, which is also grasped by the clamping bolt 41. Said bolt pushes the first area 43 of the elastic element 23 against the upper flank 45 of the first groove 29 and simultaneously the counter-piece 33 against the bottom flank 47 of the first groove 31. Since the counter-piece 33 and in particular the first area 43 of the elastic element 23 exhibits a cross section that deviates from the circular arc shape, when tightening the clamping bolt 41 a twist-proof anchoring of the elastic element 23 in the base body of the first tool part 3 is guaranteed.

In FIG. 3 it is evident that a first recess 49, which intersects the first groove 29, is cut into the wall of the first tool part 3. In addition, there is a second recess 51, which intersects the first groove 31. Through the first recess 49 the second area 25 of the elastic element 23 projects through the wall of the first tool part 3 into its recess 5 and into the path of motion of the second tool part 7, which is inserted into the recess 5 and which is not illustrated here.

The second recess 51 serves to move optionally the elastic element 23 and to move from the first groove 29 into the second groove 31, whereby the counter-piece 33 is also moved correspondingly into the opposite groove. Thus, it is possible to guarantee in a simple way a defined angular position of rotation by means of the elastic element 23, independently of whether the hollow shaft of the second tool part 7 is supposed to strike against the upper side face 19 or the lower side face 21 of the projection 13. Hence, the device 15 for effecting a defined angular position of rotation can be used in general for a right and/or left stop.

Figure 4:
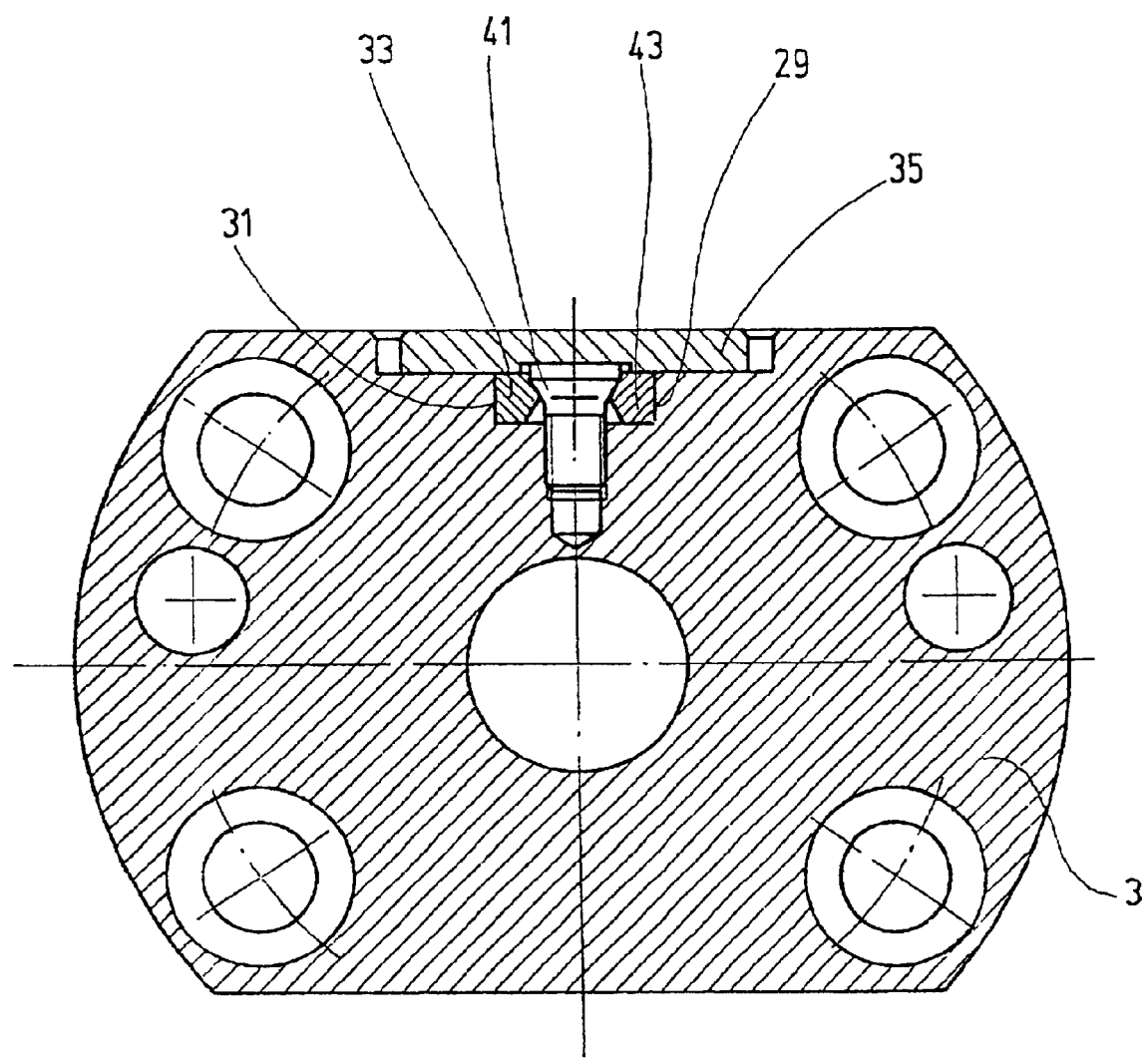
FIG. 4 is a longitudinal sectional view along the line IV—IV of the tool depicted in FIG. 2.

FIG. 4 is a sectional view along the line IV—IV, shown in FIG. 2. Quite evident here is the cover plate 35, which is anchored to the first tool part 3 and which closes the first groove 29 and the second groove 31 and thus holds twist-proof the first area 43 of the elastic element and the counter-piece 33. In addition, the clamping bolt 41 can be clearly recognized. It provides that the first area 43 is held firmly and is braced against twisting. Owing to the special contour of the first area 43 and that of the counter-piece 33 that exhibit the approach slopes, extending here in the shape of a V from the top to the bottom, the head, which belongs to the clamping bolt 41 and which tapers conically toward the bottom, forces apart the first area 43 and the counter-piece 33 in such a manner that a twisting of the elastic element 23 is reliably avoided.

Figure 5:
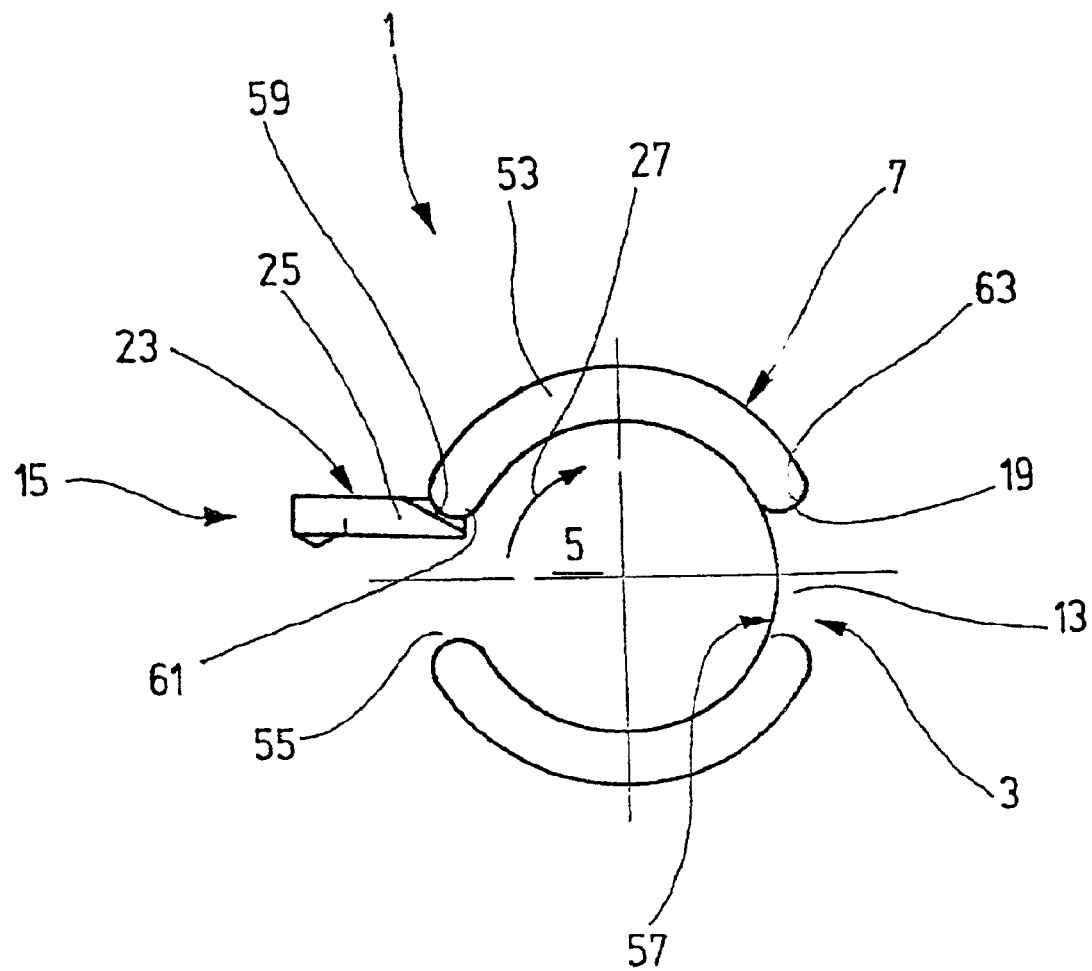
FIG. 5 is a schematic drawing of a top view of a first and second tool part of a connecting point.

FIG. 5 illustrates once again the functionality of the device 15 inside the connecting point 1, which is reproduced here only in part as a schematic drawing. FIG. 5 shows the connecting point 1 in a top view, as is also the case in FIG. 1. One can clearly perceive the second area 25 of the elastic element 23, which projects into the recess 5 of the first tool part 3, which is only indicated here, and into the path of motion of the second tool part 7, of which the hollow shaft 53 is indicated here. One can recognize here that the hollow shaft 53 exhibits two slots 55 and 57, which run in the longitudinal direction of said shaft. The second area 25 of the elastic element 23 projects into the first slot 55; the projection 13, which was explained with reference to FIG. 1, projects into the second slot 57. The second area 25 of the elastic element exhibits here an approach slope 59, which interacts in such a manner with a side face 61 of the first slot 55, that a force, directed in the direction of the arrow 27, acts on the hollow shaft 53. The result is that the side face 63 of the second slot 57 rests against the side face 19 of the projection 13, thus resulting in a defined angular position of rotation between the hollow shaft 53 of the second tool part 7 and the projection 13 of the first tool part 3. For a general application of the elastic element 23 for a right and left stop of the hollow shaft 53 at the projection 13, the second area 25 can be provided on its free end with symmetrical approach slopes. Moreover, it is possible to provide an element 23, which is designed laterally reversed, if a clamping force that is directed in the opposite direction to the arrow 27 is supposed to be raised.

After the two tool parts have assumed a defined angular position of rotation by means of the device 15, the two tool parts can be clamped now in the area of the connecting point 1 in that the collet 11 is activated in the conventional way and expands the hollow shaft 53 of the second tool part 7 in such a manner that it rests reliably against the inner surface of the recess 5.

In operating the connecting point 1 high torques can be transferred over the projection 13 from the first tool part 3 to the second tool part 7 or vice versa. When the tool rotates counterclockwise in the area of the connecting point 1, it is guaranteed that even under load there is no relative rotation between the first tool part 3 and the second tool part 7, because the device 15 guarantees that the side face 63 of the hollow shaft 53 will rest against the side face 19 of the projection 13.

It is evident from the operating mode of the device 15 that in principle a short pin, inserted into the side wall of the first tool part 3, can be used as the elastic element 23 in order to specify a defined angular position of rotation of the tool pieces. If, however, the elastic element 23 is designed in the shape of an L, as explained here, and hence as a torsion element, the result is a longer path of deformation inside the elastic element 23 so that a fatigue fracture can be virtually ruled out. In addition, the prestress forces, which are supposed to be generated by bringing about the angular position of rotation, can be varied through the choice of the length and/or the diameter of the leg, which belongs to the elastic element 23 and which runs in the longitudinal direction of the connecting point 1, or through the choice of the material of the element 23, which is made preferably of metal. Thus, it is important that when the tool parts 3, 7 assigned to the connecting point 1 are joined together, the elastic element 23 is deflected and deformed reversibly. The reset forces of the elastic element 23 result in a relative rotation between the tool parts 3, 7 so that a defined angular position of rotation is guaranteed.

From the above it is also clear that several elastic elements 23 can be distributed over the circumference of the first tool part 3 in order to increase the adjusting forces. Finally it is also conceivable to provide at least one elastic element in addition to or in place of the second tool part 7 that is described here. Furthermore, the elastic element can also be disposed on the face-sided contact surface of two tool parts or can engage here with one or both tool parts in order to obtain a defined angular position of rotation.

What is claimed is:

1. A cutting tool having at least one connecting point between a first tool part and a second tool part, the connecting point comprising:

a first tool part;

a second tool part having a hollow shaft and being coaxially connectable to said first tool part; and an elastic element for effecting a defined angular position of rotation between said first and second tool parts, the elastic element having in a first area and a second area, the first area being clamped to said first tool part in such a manner that in connecting said first and second tool parts said second area of said elastic element projects into the path of rotational motion of said second tool part so that said second area of said elastic element is deflected by said second tool part and is deformed reversibly to provide a force in the direction of rotation against said second tool part.

2. The cutting tool, as claimed in claim 1, wherein the elastic element forms a torsion element.

3. The cutting tool, as claimed in claim 2, wherein the elastic element is configured as an L shape and exhibits a projection forming said second area, the projection projecting into a connecting area between the first tool part and second tool part.

4. A cutting tool, as claimed in claim 3, wherein the first tool part has a wall and a recess, and wherein the projection of the elastic element is disposed in the wall of the first tool part and projects into the interior of the recess.

5. A cutting tool, as claimed in claim 2, wherein the first area of the elastic element is clamped to the first tool part, and wherein the elastic element has at least one segment the area of which deviates in cross section from a circular shape.

6. A cutting tool, as claimed in claim 5, wherein the first area of the elastic element has a cross-sectional shape which is polygonal.

7. A cutting tool, as claimed in claim 2, wherein the first tool part has a recess for receiving the hollow shaft of said second tool part.

8. A cutting tool, as claimed in claim 2, wherein the first tool part has a wall and wherein the elastic element is installed in the wall.

9. A cutting tool, as claimed in claim 8, further comprising two grooves disposed in the wall of the first tool part for the purpose of receiving at least one elastic element.

10. A cutting tool, as claimed in claim 9, wherein the first tool part has a recess and wherein at least one of said two grooves intersects the recess.

11. A cutting tool, as claimed in claim 2, the first tool part having a wall and further comprising a counter-piece positioned proximate to said elastic element, the counter-piece being installed into the wall of the first tool part.

12. The cutting tool, as claimed in claim 1, wherein the elastic element forms an L shape having a projection forming the second area, the projection projecting into a connecting area between the first tool part and second tool part.

13. A cutting tool, as claimed in claim 12, wherein the first tool part has a wall and a recess, and wherein the projection of the elastic element is disposed in the wall of the first tool part and projects into the interior of the recess.

14. A cutting tool, as claimed in claim 1, wherein the first area of the elastic element is clamped to the first tool part, and wherein the elastic element has at least one segment the area of which deviates in cross section from a circular shape.

15. A cutting tool, as claimed in claim 14, wherein the first area of the elastic element has a cross-sectional shape which is polygonal.

16. A cutting tool, as claimed in claim 1, wherein the first tool part has a recess for receiving the hollow shaft of said second tool part.

17. A cutting tool, as claimed in claim 1, wherein the first tool part has a wall and wherein the elastic element is installed in the wall.

18. A cutting tool, as claimed in claim 17, further comprising two grooves disposed in the wall of the first tool part for the purpose of receiving at least one elastic element.

19. A cutting tool, as claimed in claim 18, wherein the first tool part has a recess and wherein at least one of said two grooves intersects the recess.

20. A cutting tool, as claimed in claim 17, further comprising a counter-piece, positioned proximate to said elastic element; and installed into the wall of the first tool part.

* * * * *